(12) United States Patent
Black

(10) Patent No.: US 7,354,059 B2
(45) Date of Patent: Apr. 8, 2008

(54) WHEELBARROW STAND WITH TILT LEVELING MECHANISM

(76) Inventor: Charles Black, 2346 E. Old State Rd., East Jordan, MI (US) 49727

( * ) Notice: Subject to any disclaimer, the term of this patent is extended or adjusted under 35 U.S.C. 154(b) by 277 days.

(21) Appl. No.: 11/136,290

(22) Filed: May 24, 2005

(65) Prior Publication Data

US 2005/0218614 A1  Oct. 6, 2005

Related U.S. Application Data

(63) Continuation of application No. 10/439,133, filed on May 15, 2003, now abandoned.

(51) Int. Cl.
*B61B 1/18* (2006.01)
(52) U.S. Cl. .................. 280/653; 280/654; 280/47.31; 280/47.33
(58) Field of Classification Search ............... 280/653, 280/654, 655, 43.1, 43.14, 43.24, 47.26, 280/47.31, 47.33, 763.1, 764.1, 6.151; 298/2, 298/3
See application file for complete search history.

(56) References Cited

U.S. PATENT DOCUMENTS

| | | | |
|---|---|---|---|
| 127,065 A | 5/1872 | Kanmacher | |
| 411,319 A | 9/1889 | Barr | |
| 879,861 A | 2/1908 | Ferguson | |
| 1,158,291 A * | 10/1915 | Rickards | 280/47.31 |
| 4,270,786 A | 6/1981 | Mattox | 298/3 |
| 4,767,128 A | 8/1988 | Terhune | 280/47.2 |
| 4,789,171 A | 12/1988 | Porter | 280/47.18 |
| 5,149,116 A | 9/1992 | Donze et al. | 280/47.26 |
| 5,305,843 A | 4/1994 | Armstrong | 180/19.1 |
| 5,372,376 A | 12/1994 | Pharaoh | 280/653 |
| 5,531,463 A | 7/1996 | Givens | 280/47.2 |
| 5,924,708 A | 7/1999 | Bisaillon et al. | 280/47.26 |
| 6,099,025 A * | 8/2000 | Rohrs | 280/659 |
| 6,390,496 B1 | 5/2002 | Eicher | 280/653 |
| 7,134,676 B2 * | 11/2006 | Capers et al. | 280/47.31 |
| 7,147,234 B2 * | 12/2006 | Davis | 280/47.31 |
| 2004/0222604 A1 | 11/2004 | Capers, Jr. et al. | 280/47.31 |
| 2005/0012285 A1 | 1/2005 | Davis | 280/47.31 |

* cited by examiner

*Primary Examiner*—Christopher P. Ellis
*Assistant Examiner*—Brian L Swenson
(74) *Attorney, Agent, or Firm*—Gifford, Krass, Sprinkle, Anderson & Citkowski, P.C.

(57) ABSTRACT

A tilting mechanism incorporated into a conventional load carrying device including a bucket portion, a pair of elongated handles supporting the bucket portion, and a front wheel. The tilting mechanism includes a frame adapted to being secured to a rearwardly extending location of the elongated handles and such that the bucket portion is disposed between the frame and the front wheel. Elongated supports are incorporated into the frame and, in combination with the front wheel, support the wheelbarrow upon a surface. The frame includes structure for establishing an angle or incline, relative to an uneven or peaked surface, and is actuated to facilitate tilting of the bucket portion about a longitudinal axis extending through the load carrying device.

17 Claims, 8 Drawing Sheets

WHEELBARROW STAND WITH TILT LEVELING MECHANISM

CROSS REFERENCE TO RELATED APPLICATIONS

The present application is a continuation of U.S. application Ser. No. 10/439,133, filed May 15, 2003, now abandoned for a "Wheelbarrow Stand with Tilt Leveling Mechanism."

BACKGROUND OF THE INVENTION

1. Field of the Invention

The present invention relates generally to load carrying device support and adjustment mechanisms. More specifically, the present invention discloses a tilt leveling mechanism incorporated into a load carrying device, such as a wheelbarrow, for providing a compensating and sideways tilting support to the said device when supporting on an angled or pitched surface, such as a roof.

2. Description of the Prior Art

The prior art discloses a variety of wheelbarrow support and transport mechanisms. In particular, the prior art discloses a variety of mechanisms for supporting and pivoting a bucket portion of the wheelbarrow.

A first example of this is set forth in Eicher, U.S. Pat. No. 6,390,496, which teaches an adapter apparatus for assisting in transportation of a wheelbarrow and which teaches the forward pivoting of the load carrying container portion of the wheelbarrow. Bisaillon et al., U.S. Pat. No. 5,924,708, teaches a steer-support mechanism for a wheelbarrow and incorporating a pair of "L" shaped axles carrying wheels and which is rotatably mounted in vertical sleeves on the frame of the wheelbarrow.

Givens, U.S. Pat. No. 5,531,463, teaches a support attachment for ease in side emptying a wheelbarrow and which includes a "U" shaped bracket positioned orthogonal to the front portion of a wheelbarrow wheel and the legs of the bracket extending along and attached to associated front end locations of the wheelbarrow handles. Pharoah, U.S. Pat. No. 5,372,376, teaches a foldable wheelbarrow (see FIGS. 3a-3d) and which collapses in the manner shown.

Armstrong, U.S. Pat. No. 5,305,843, teaches a power driven wheelbarrow incorporating a pair of frame members connected at a front portion thereof, a drive wheel rotatably mounted at the front portion of the frame members and a motor for providing rotational motion to a first shaft about an axis having a direction substantially normal to a direction of an axis of rotation of the drive wheel. A sealed gear box converts the rotational motion provided by the first shaft to a direction substantially parallel to the direction of rotation of the drive wheel and outputs the converted rotational motion. A roller selectively engages and disengages the rotational motion output by the sealed gear box to and from the drive wheel.

Donze, U.S. Pat. No. 5,149,116, teaches a multi-wheel wheelbarrow with a balanced center of gravity caused by the axis of the wheelbarrow being removably mounted in bearings and disposed at the front end of the wheelbarrow. The wheel axle is adapted to accommodate different wheel arrangements for use on different kinds of ground or terrain.

Porter, U.S. Pat. No. 4,789,171, teaches a multipurpose barrow vehicle which, similar to Eicher previously described, allows for forward tilting of the container carrying portion. Terhune, U.S. Pat. No. 4,767,128, teaches a modified wheelbarrow construction with a built-in and automatic brake assembly. Finally, Mattox, U.S. Pat. No. 4,270,786, discloses a dumping wheelbarrow capable of providing a forward tilt while maintaining the legs of the wheelbarrow on the ground. The barrow is pivoted at a forward barrow point and is caused to dump by the action of a hydraulic piston affixed at one end to the frame and at the other end to the bottom of the barrow.

SUMMARY OF THE PRESENT INVENTION

The present invention discloses a tilting mechanism incorporated into a load carrying device, such as a wheelbarrow, which in particular operates to adjust an angle established by the bucket portion relative to an uneven or peaked surface, such as is further typical of a peaked roof or the like. It is an objective of the invention to enable a load carrying device incorporating the tilting mechanism to be utilized and supported upon a peaked roof or other uneven surface permitting the angular orientation, or tilt, of the bucket to be altered about its longitudinal axis relative to the angle or peak established by the support surface.

In a first preferred embodiment, the tilting mechanism includes a base plate from which extend bracket supports for securing the mechanism to selected underside locations of the elongated support handles associated with the load carrying device. An arcuate extending member, typically spring-biasing and essentially "U" shaped, is rotatably secured to the frame by means of a cross member, and supports the wheelbarrow device upon a surface.

An arcuate shaped gear plate is fixedly secured to the cross member and arcuate extending member and is further rotatably secured to the base plate by a rotational bearing. A spring-loaded projection extends through the main plate and engages a selected serrated edge location of the gear plate. The spring-loaded projection is retracted from the gear plate, typically through the use of a pivotally secured and elongated handle, and in order to readjust the sideways angle or tilt of the tilting mechanism relative to the longitudinal axis extending through the wheelbarrow and established with a peaked or inclined ground surface.

A secondary embodiment of the invention discloses the tilting mechanism as including first and second telescoping support legs and associated first and second elongated and downwardly extending housings from which the support legs telescope. Each of the support legs further includes a plurality of spaced apart and axially extending apertures, the elongated housings each further incorporating an inwardly directed pin which seats within a selected support leg aperture and in order to define an overall tilt associated with the wheelbarrow.

A brake cable actuating device is provided for successively adjusting each of the telescoping support legs. A clutch handle is mounted to a selected load carrying device handle, such that the brake cable extends from the clutch handle at a first end and connects to each of the pins at second spaced apart ends. In order to secure the frame to the load carrying device, a pair of brackets extend angularly between the downwardly extending housings and forwardly disposed locations of the elongated device handles, whereas a crosswise bracket extends proximate an upper edge location of said frame and secures to additional locations associated with the handles.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 6:
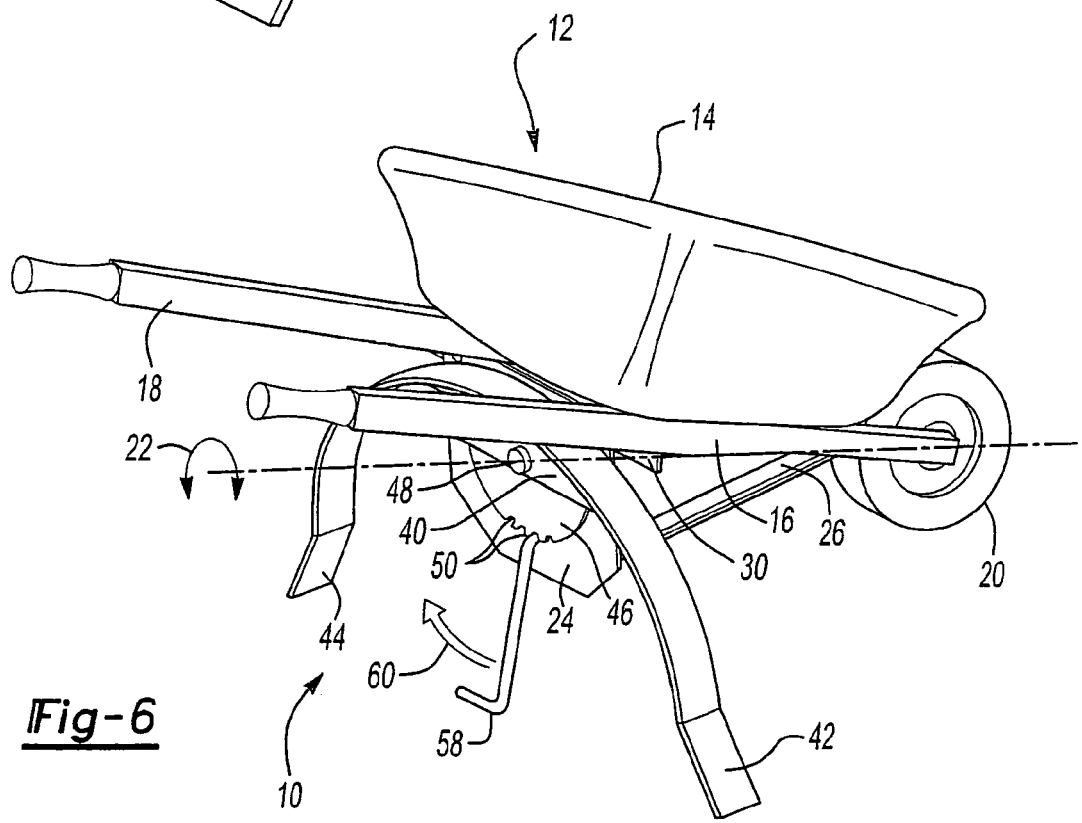
FIG. 6 is an environmental view in perspective of the tilting mechanism according to the present invention fitted to a conventional wheelbarrow device.

Referring now to FIGS. 1-6, a series of views are illustrated of a tilting mechanism 10 incorporated into a conventional wheelbarrow device, see further at 12 in FIG. 6, according to a first preferred embodiment of the present invention. As previously explained, the present invention discloses a tilting mechanism incorporated into a conventional load carrying device, such as a wheelbarrow, which in particular operates to adjust an angle established by the bucket portion relative to an uneven or peaked surface, such as is further typical of a peaked roof or the like, and in particular to maintain a level condition of the bucket portion associated with said load carrying device when set upon the uneven or peaked surface. It is also an objective of the invention to enable a device incorporating the tilting mechanism to be utilized and supported upon a peaked roof or other uneven surface by permitting the angular orientation, or tilt, of the bucket to be altered about its longitudinal axis relative to the angle or peak established by the support surface.

As is further conventionally known in the art, the wheelbarrow 12 includes a bucket portion 14 and a frame, further constructed of main handlebar members 16 and 18 and front wheel 20. As will be further described in detail, the feature of the rearwardly disposed supports is removed in the retrofitted wheelbarrow illustration of FIG. 6 and in its place the tilting mechanism is operated to establish an overall tilt, as further illustrated by bi-directional and angled arrow 22 taken about a longitudinal axis extending through the wheelbarrow 12, and its associated front wheel 20. As is also evident from FIG. 6, and in the first preferred embodiment, the conventional rearwardly disposed supports of the wheelbarrow are substituted by the supporting structure incorporated into the tilting mechanism.

In the first preferred embodiment, and referring again to each of FIGS. 1-6, a tilting mechanism 10 is constructed of a strong and durable material, typically a metal, and includes a base plate 24. The base plate 24 is preferably constructed of a durable metal having a selected outline, in the illustrations of FIGS. 1-6 being shown as a six-sided or hexagonal plate.

Bracket supports secure the tilting mechanism to selected underside locations of the elongated support handles associated with the wheelbarrow 12 and further such that the bucket portion 14 is disposed between the tilting mechanism frame and the front wheel 20. The bracket supports include a pair of elongated brackets 26 and 28 extending rearwardly from the base plate 24, and a crosswise bracket 30 extending proximate an upper edge location of the base plate 24. As illustrated, each of the bracket supports 26, 28, and 30 form a substantially "L" shape in cross section. As further best illustrated in FIG. 1, a plurality of apertures, see further at 32, 34, and 36, respectively, are provided for the bracket supports 26, 28 and 30 and which, in combination with screw fasteners or the like, engage to the selected underside locations of the wheelbarrow handles 16 and 18, as further best shown in FIG. 6, and in order to mount the tilting mechanism 10 to the wheelbarrow device. It is further understood that other configurations can be substituted for the base plate and bracket support arrangement which are constructed to both adequately support the wheelbarrow device as well as permit its pivoting adjustment.

An arcuate extending member, typically spring-biasing and essentially "U" shaped as illustrated at 38, is rotatably secured (as will be shortly described) to the base plate 24 by means of a cross member 40 and in order to support the wheelbarrow device upon a surface, such as again a peaked or inclined surface (not shown). The "U" shaped member 38 includes a pair of downwardly directed and terminating ends, 42 and 44, which engage upon the selected locations of the peaked or inclined surface. It is further understood that other possible configurations can be substituted for the "U" shaped member which are constructed to both adequately support the wheelbarrow device, as well as permit its pivoting adjustment and as will now be explained.

An arcuate shaped gear plate is illustrated at 46 and is fixedly secured to the cross member 40 and arcuate extending member 38. The gear plate 46 exhibits any desirable configuration, such as a rounded or arcuate shaped exterior surface, and is rotatably secured to the base plate 24 by a rotational bearing 48 or the like.

The gear plate 46 further exhibits a plurality of spaced apart and exteriorly facing serrations 50 extending along a lower arcuate edge thereof. A spring-loaded projection 52 is mounted to a bracket 54 on a first selected side of the base plate 24 and extends through a slot 56 defined in the plate 24, in proximity to the serrated edges 50, in order to engage a selected serrated edge location of the gear plate 46.

Figure 1:
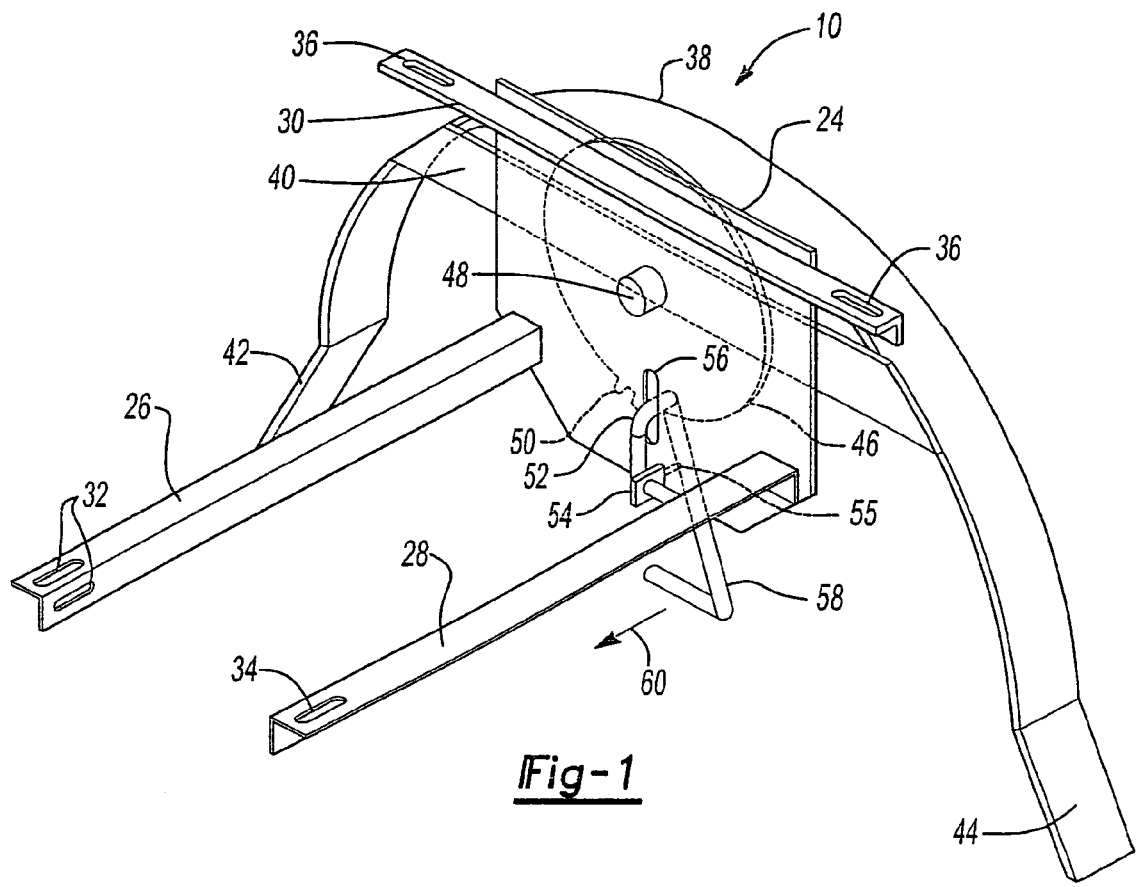
FIG. 1 is a frontal perspective view of the tilting mechanism incorporated into a conventional wheelbarrow device according to a first preferred embodiment of the present invention.
Figure 2:
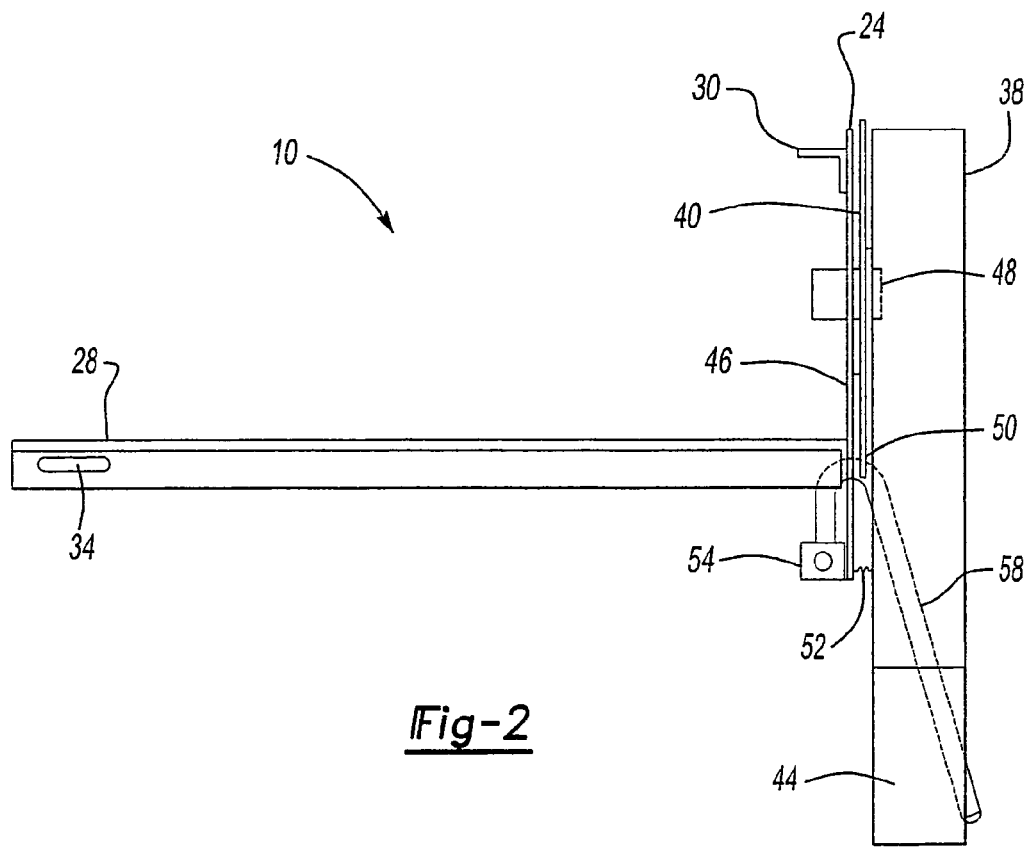
FIG. 2 is a side view of the tilting mechanism shown in FIG. 1.
Figure 3:
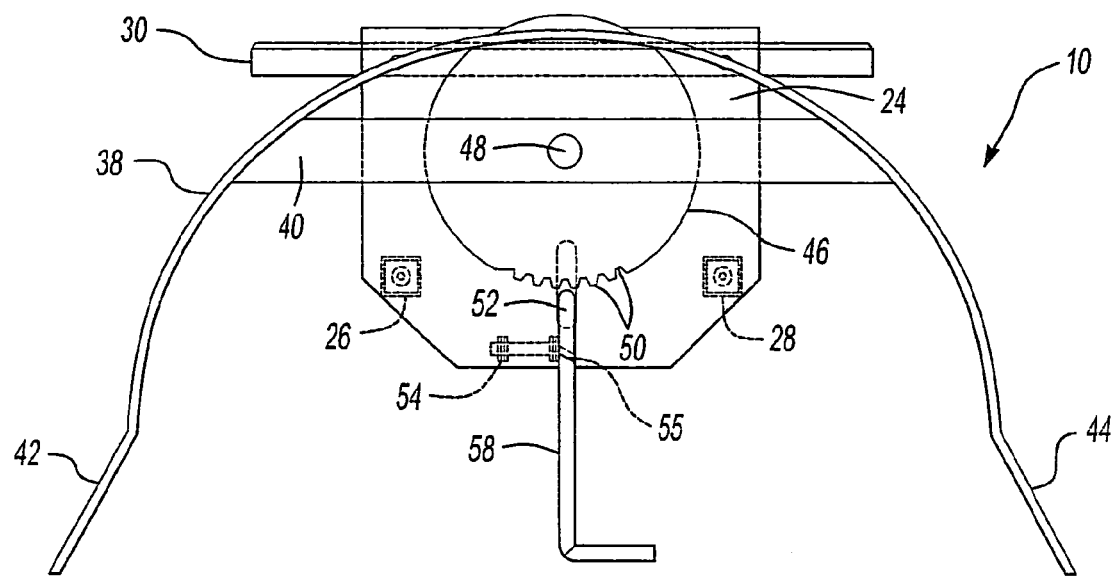
FIG. 3 is a front view of the tilting mechanism according to the present invention.
Figure 4:
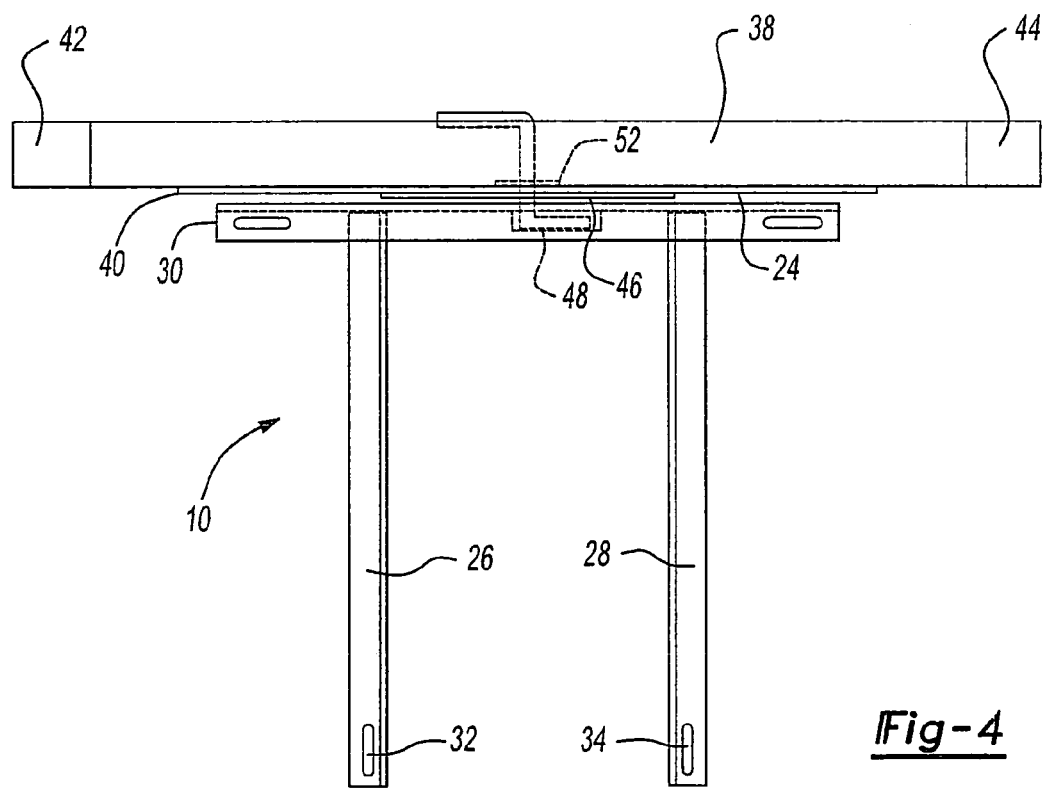
FIG. 4 is a top view of the tilting mechanism according to the present invention.
Figure 5:
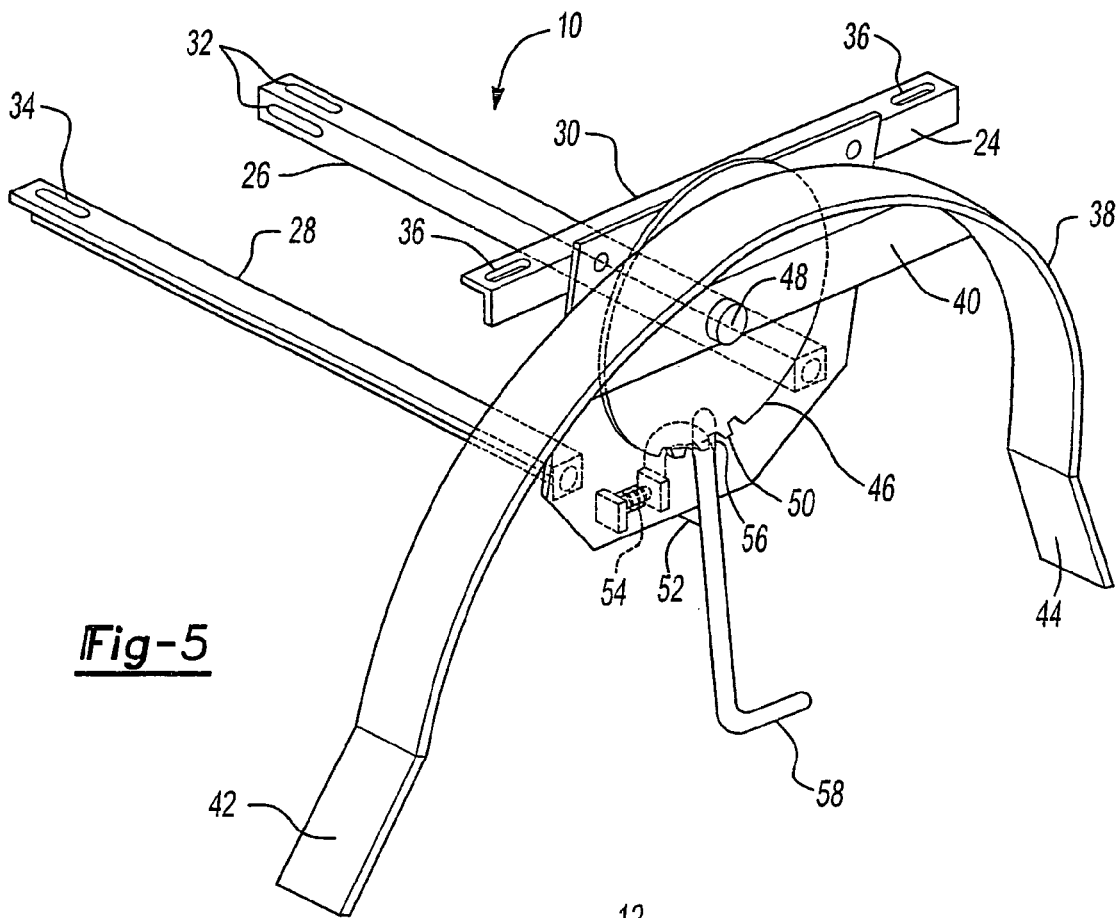
FIG. 5 is a rear perspective view of the tilting mechanism according to the preferred embodiment of FIG. 1.

The spring-loaded projection 52 is retracted from contact with the gear plate 46, typically through the use of a pivotally secured and elongated handle 58 being actuated in a direction indicated by arrow 60 in FIGS. 1 and 6, and in order to readjust the sideways angle or tilt of the wheelbarrow 12 relative to the longitudinal axis 22 extending through the wheelbarrow and established with such as a peaked or inclined ground surface. As further best shown in the perspective view of FIG. 1, the bracket 54 provides the intermediate linkage between the handle 58 and the projection 52 and typically houses the spring element (see at 55 in FIG. 1) necessary for establishing the biasing engagement. The projection 52 is further typically unseated from the gear plate 46 upon being depressed by the user's foot and tilted in a given direction by the user's grip on the handles 16 and 18. It is further understood that other configurations can be substituted for the gear plate and projection arrangement which are constructed to both adequately support the wheelbarrow device as well as permit its pivoting adjustment.

Figure 7:
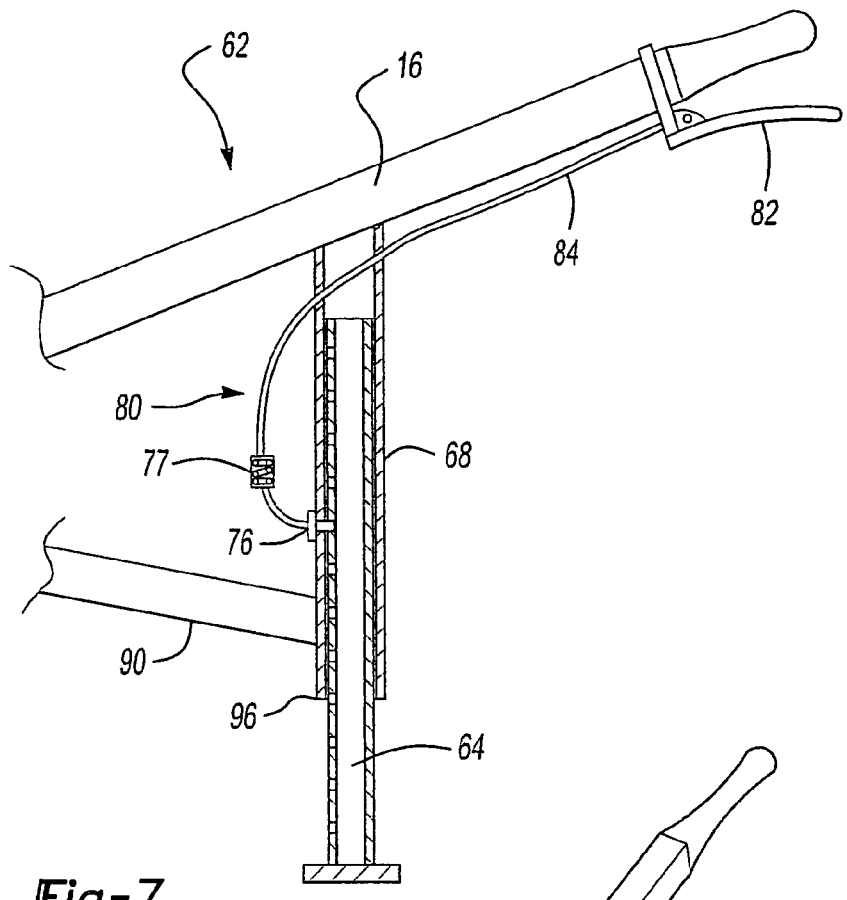
FIG. 7 is a side view in section of the tilting mechanism according to a second preferred embodiment of the present invention.
Figure 8:
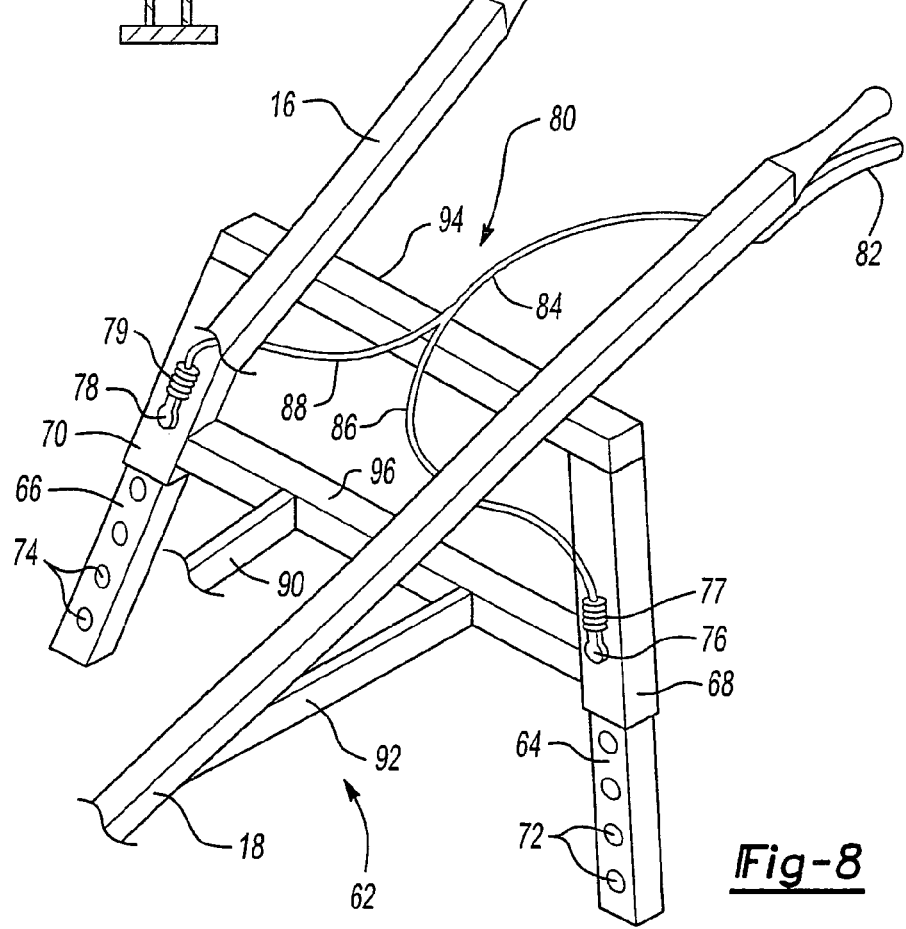
FIG. 8 is a perspective view of the tilting mechanism according to the second preferred embodiment and illustrating the brake cable actuating device for successively adjusting each of the telescoping wheelbarrow support legs.
Figure 9:
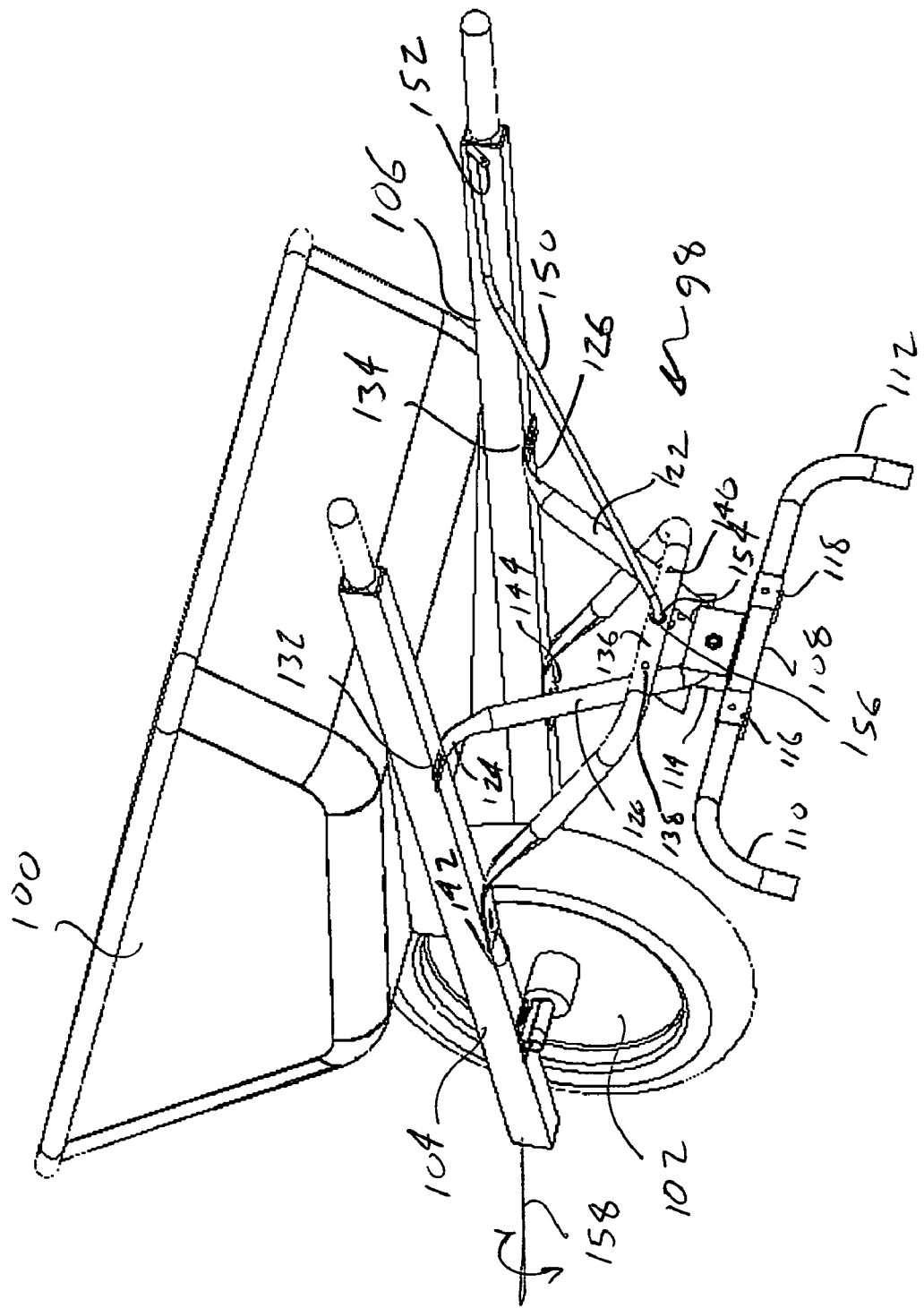
FIG. 9 is a perspective view of the tilting mechanism incorporated into a load carrying device such as a wheelbarrow and according to a third preferred embodiment of the present invention.

Referring to FIGS. 7 and 8, a secondary embodiment of the tilting mechanism of the invention is illustrated at 62 according to the present invention. As is illustrated in FIGS. 7 and 8, only the tilting mechanism 62 is illustrated, along with the pair of elongated handles 16 and 18 associated with the wheelbarrow, it being understood that the remaining components are the same as previously described.

The tilting mechanism 62 discloses the elongated supports as including first 64 and second 66 telescoping support legs and associated first 68 and second 70 elongated and downwardly extending (interiorly hollowed) housings from which the support legs 64 and 66 telescope. Each of the support legs 64 and 66 further include a plurality of spaced apart and axially extending apertures, see at 72 and 74, respectively in FIG. 8. The elongated housings 68 and 70 each further incorporate an inwardly directed pin, see at 76 and 78, respectively, which seats within a selected support leg aperture 72 and 74, in order to define an overall tilt associated with the wheelbarrow device.

A brake cable actuator is generally referenced at 80 for successively adjusting each of the telescoping support legs 64 and 66. A clutch handle 82 is mounted to a selected wheelbarrow handle, such as handle 16 illustrated, and further such that a brake cable 84 associated with the cable actuating device extends from the clutch handle 82 at a first end and operatively connects to each of the pins 76 and 78 at second split and spaced apart ends 86 and 88.

In a preferred arrangement, the cable device 80 includes an outer insulating sheath and one or more inner, flexible and axially translatable wire elements for selectively withdrawing and reseating the pins 76 and 78 relative to selected apertures associated with each downwardly telescoping leg. It is further within the understanding of the present invention that the pins 76 and 78 are spring loaded (see at 77 and 79 in FIG. 8) to their engaged position and further that the legs may be hydraulically or pneumatically charged, as well as possibly spring loaded in their downwardly telescoping direction, and so that they are influenced in a direction out of the outer housings 68 and 70 upon retraction of the pins 76 and 78. As is also contemplated, the downward force applied upon the legs 64 and 66, upon being released by the pins 76 and 78, is counteracted by the tilting and collapsing force applied to a selected leg 64 or 66 by the user.

In order to secure the frame to the wheelbarrow, a pair of brackets 90 and 92 extend angularly between the downwardly extending housings 68 and 70, respectively, and forwardly disposed locations of the elongated wheelbarrow handles 16 and 18. A crosswise bracket 94 extends proximate an upper edge location of said frame, see in FIG. 8 extending from top edge locations of the housings 68 and 70, and secures to additional locations associated with the handles 16 and 18. Additionally, a lower crosswise support is noted at 96 and contributes to the integrity of the mechanism 62.

Referring now to FIGS. 9-12, a series of illustrations are shown of a tilting mechanism 98 according to a further preferred embodiment. The mechanism 98 is illustrated in use with a load carrying device, such as a wheelbarrow, having a bucket portion 100, a forward disposed wheel 102, and a pair of extending handles 104 and 106 supporting both the underside of the bucket 100 as well as the wheel 102. While illustrative of one possible variation of a load carrying device, it is again understood that the tilting mechanism of the present invention can be incorporated into any of a number of different conventional load carrying devices without departing from the scope of the invention.

Figure 10:
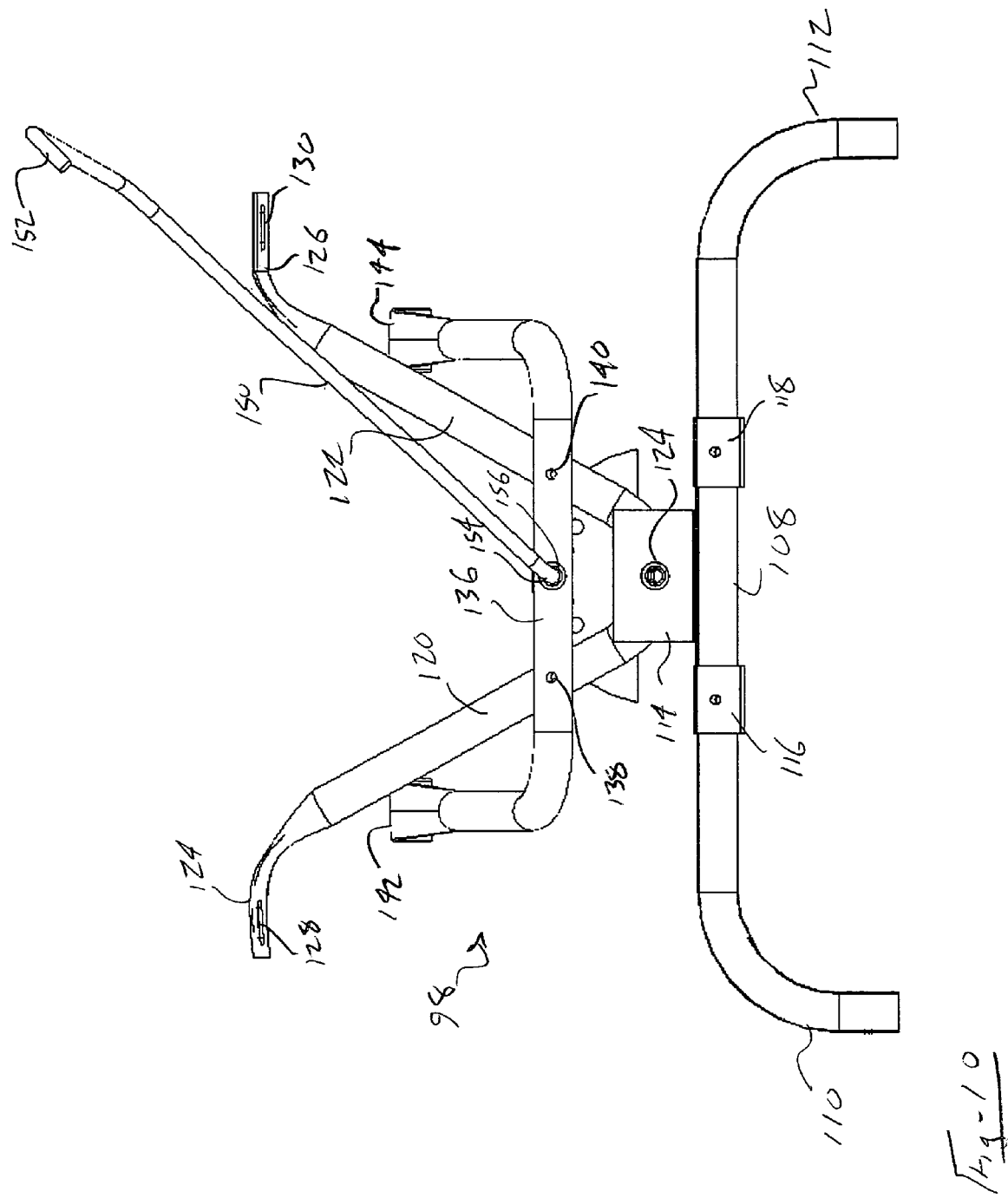
FIG. 10 is a rear view of the tilting mechanism according to FIG. 9.
Figure 11:
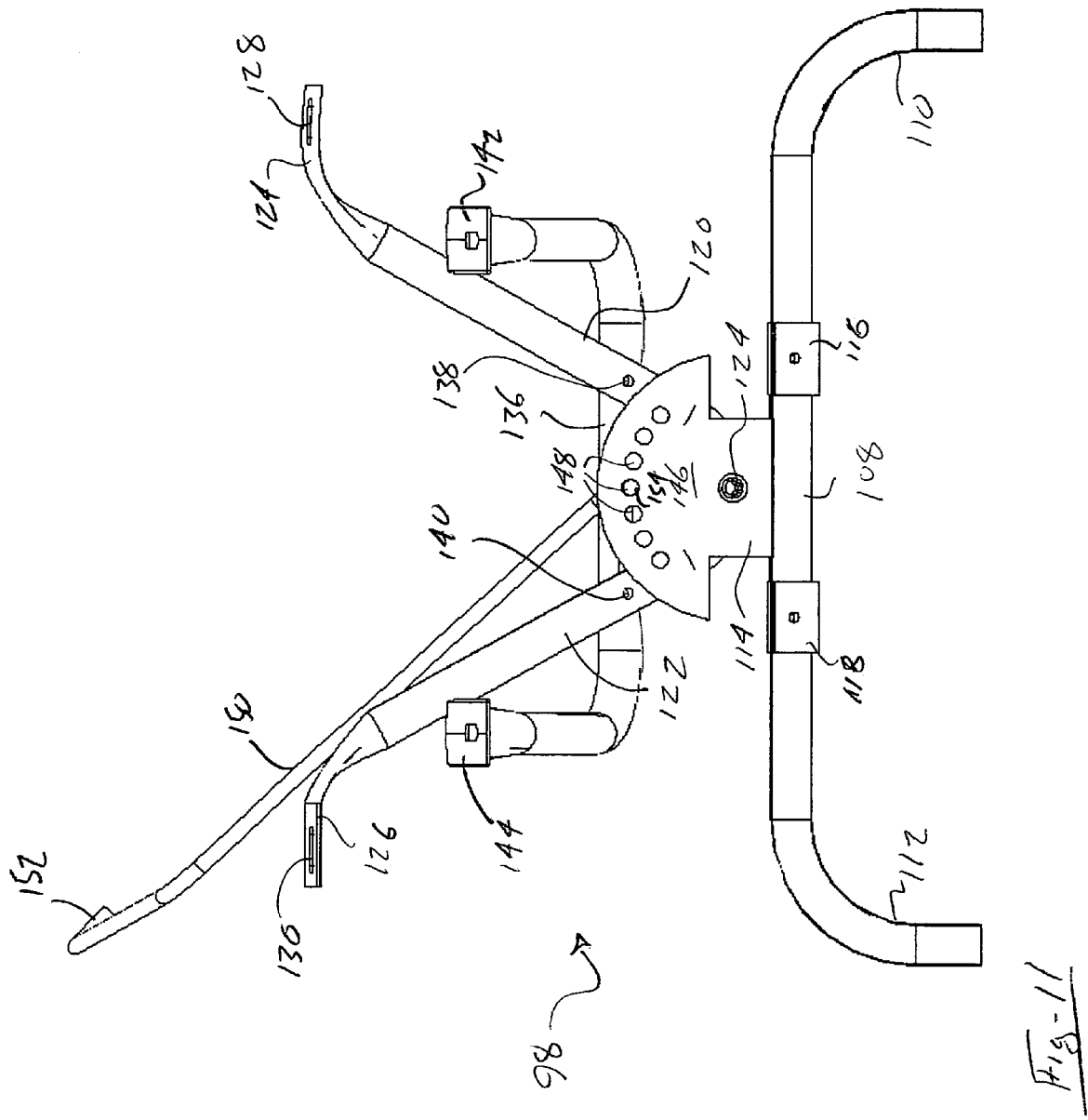
FIG. 11 is a front view of the tilting mechanism of FIG. 9.
Figure 12:
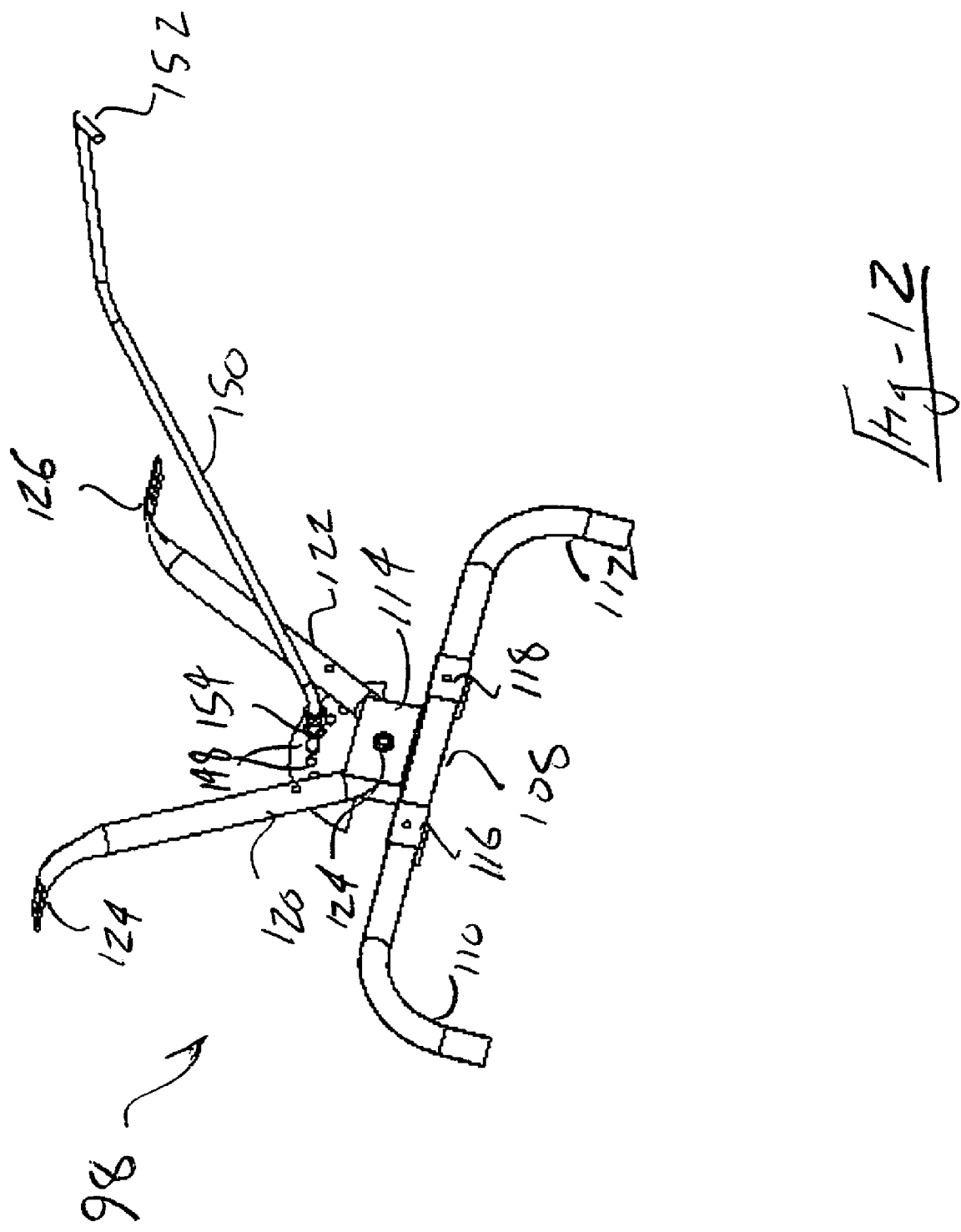
FIG. 12 is a further perspective view of the tilting mechanism detached from the load carrying device and further illustrating the disengagement handle in an actuated position according to the present invention.

As is also shown in the succeeding illustrations of FIGS. 10-12, the tilting mechanism includes an elongated and crosswise extending ground support member 108 terminating at opposite ends in a pair of downwardly extending ground support ends 110 and 112. The ground support member is typically constructed of steel, but may also include other suitable materials exhibiting the necessary properties of strength and resiliency, such as durable plastics and the like.

A bracket 114 is arranged upon an upper surface of the support member 108 and includes a substantially "U" shaped and upwardly facing channel secured in place with a pair of spaced mounting locations 116 and 118 fastened to surfaces of the support member. The "U" shaped channel of the bracket 114 defines a central pivot point connection for a substantially elongated and "V" shaped support.

The "V" support defines arms 120 and 122 which extend upwardly and outwardly from a central interconnecting location, which is secured by pivot pin 124 between the walls of the bracket 114. Upper locations of the "V" support arms 120 and 122 include configured and flattened ends 125 and 126, such as in which are defined apertures 128 and 130 for receiving fasteners to secure to underside locations 132 and 134 (see FIG. 9) of the load carrying device handles 104 and 106.

A secondary support member includes a crosswise portion 136 secured at locations 138 and 140 associated with the "V" shaped arms 120 and 122. The secondary support member further includes angled and configured ends 142 and 144 which secure to additional locations of the elongated handles 104 and 106 and which, in combination with the "V" shaped support arms, define four mounting locations for securing the underside of the handles to the mechanism and by which the load carrying device is supported upon the downwardly turned ends 110 and 112 of the crosswise support 108.

Pivoting of the bucket portion 100 of the load carrying device (e.g. wheelbarrow) relative to the crosswise extending ground support 108 member is enabled by the provision of an arcuate plate portion 146 extending from a selected upward surface of the "U" channel bracket 114. A plurality of apertures 148 are formed in spaced apart fashion proximate an arcuate extending edge of the plate portion 146.

An elongated and linearly displaceable handle 150 includes a first gripping end 152 located in proximity to an extending handle end, as well as an opposite extending end 154 which seats through a selected centermost aperture of the plurality 148 of arcuate extending apertures and which aligns with an aperture 156 in the secondary support 136 through which projects the end 154 of the handle 150.

In operation, the handle 150 is actuated rearwardly, by grasping the gripping end 152 and displacing in a direction toward the user, thus causing the opposite projecting end 154 to unseat from the arcuate plate apertures 148 and aligning aperture 156. At this point, the handle is displaced to a disengaged position (see FIG. 12) and the bucket 100 is permitted to rotate in either direction about a linearly extending centerline 158 associated with the load carrying device (see FIG. 9) to tilt the bucket 100 to a degree dictated by the progression of arcuately spaced apart apertures 148. Upon realigning the bucket 100 to a level fashion, such as upon uneven ground or a peaked roof, the handle 150 is released to reseat its opposite extending end 154 through the crosswise member aperture 156 and a further selected arcuately arrayed aperture 148. Although not shown, it is understood that the handle 150 may be spring loaded in a normally engaged position, and such as to facilitate re-engagement of the tilting mechanism in its desired angled/leveled position.

Having described my invention, additional preferred embodiments will become apparent to those skilled in the art to which it pertains and without deviating from the scope of the appended claims.

I claim:

1. A tilting mechanism incorporated into a conventional load carrying device, the device including a bucket portion, a pair of elongated handles supporting the bucket portion, and a front wheel, said tilting mechanism comprising:
a frame secured to locations of the elongated handles and such that the bucket portion is disposed between said frame and the front wheel;
said frame further comprising first and second support ends which, in combination with the front wheel, supports the device upon a surface; and
a pivoting mechanism incorporated into said frame and including a pivot point positioned approximate said support ends and a distance below the bucket, said frame being actuated to facilitate tilting of the bucket portion about a longitudinal axis along said pivot point extending through the front wheel and to arrange the bucket portion in a level fashion relative to the surface.

2. The tilting mechanism as described in claim 1, said frame further comprising a base plate from which extend supports for mounting said frame to underside locations of the elongated handles.

3. The tilting mechanism as described in claim 2, said frame further comprising a pair of elongated brackets extending rearwardly from said base plate, a crosswise bracket extending proximate an upper edge location of said base plate.

4. The tilting mechanism as described in claim 3, further comprising an arcuate and fixedly positioned extending member having first and second downwardly directed ends, a cross beam securing opposite sides of said arcuate extending member, said elongated brackets extending rearwardly from said base plate being arranged in rotative fashion relative to maid fixedly positioned arcuate member.

5. The tilting mechanism as described in claim 4, further comprising an arcuate shaped gear plate secured to said cross beam, a rotational beating interconnecting said cross beam and gear plate with said base plate.

6. The tilting mechanism as described in claim 5, said gear plate further exhibiting a plurality of spaced apart serrations along a lower arcuate edge thereof, a slot formed through said base plate in proximity to said serrations and a spring-loaded projection extending through said slot and engaging a selected serration to define a specified tilt of the bucket portion relative to the pound surface.

7. The tilting mechanism as described in claim 6, further comprising an elongated handle pivotally secured to said spring-loaded projection via a support tab extending from a surface of the base plate.

8. A tilting mechanism incorporated into a conventional load carrying device, the device including a bucket portion, a pair of elongated handles supporting the bucket portion, and a front wheel, said tilting mechanism comprising:
a frame secured to locations of the elongated handles and such that the bucket portion is disposed between said frame and the front wheel;
said frame further comprising an elongated and crosswise extending ground support member exhibiting first and second downwardly angled ground support ends which, in combination with the front wheel, supports the device upon a surface; and
a pivoting mechanism incorporated into said frame and which is actuated to facilitate tilting of the bucket portion about a longitudinal axis extending through the front wheel and to arrange the bucket portion in a level fashion relative to the surface.

9. The tilting mechanism as described in claim 8, said frame further comprising a bracket secured to a central location of the crosswise extending ground support member, a "V" shaped support including first and second upwardly extending arms securing to locations along the handles, a central pivoting interconnection being established between said "V" support and said bracket.

10. The tilting mechanism as described in claim 9, further comprising a secondary support member extending in crosswise fashion and securing at locations to said "V" shaped support arms, extending ends of said secondary support member engaging additional locations associated with the load carrying device arms.

11. The tilting mechanism as described in claim 10, further comprising an arcuate plate portion incorporated into a crosswise extending surface of said bracket portion, a plurality of arcuately spaced apart and perimeter extending apertures being defined in said plate portion.

12. The tilting mechanism as described in claim 11, further comprising a linearly displaceable handle having a first gripping end secured in proximity to an extending handle end, a second projecting end seating through a support aperture defined in said secondary support member and, upon rotating the bucket about a centerline extending through the front wheel, aligning and seating through a selected one of said apertures defined in said arcuate plate portion.

13. A tilting mechanism incorporated into a conventional load carrying device, the device including a bucket portion, a pair of elongated handles supporting the bucket portion, and a front wheel, said tilting mechanism comprising:
a frame secured to locations of the elongated handles and such that the bucket portion is disposed between said frame and the front wheel, said frame further comprising an elongated and crosswise extending ground support member exhibiting first and second downwardly angled ground support ends which, in combination with the front wheel, supports the device upon a surface;
a "V" shaped support including first and second upwardly extending arms secured to locations along the handles, a central pivoting interconnection being established between said "V" support and a bracket secured to said crosswise extending ground support member; and
a pivoting mechanism incorporated into said frame and which is actuated to facilitate tilting of the bucket portion about a longitudinal axis extending through the central pivoting interconnection and the front wheel and to arrange the bucket portion in a level fashion relative to the surface.

14. The tilting mechanism as described in claim 13, further comprising a secondary support member extending in crosswise fashion and securing at locations to said "V" shaped support arms, extending ends of said secondary support member engaging additional locations associated with the load carrying device arms.

15. The tilting mechanism as described in claim 14, further comprising an arcuate plate portion incorporated into a crosswise extending surface of said bracket portion, a plurality of arcuately spaced apart and perimeter extending apertures being defined in said plate portion.

16. The tilting mechanism as described in claim 15, further comprising a linearly displaceable handle having a first gripping end secured in proximity to an extending handle end, a second projecting end seating through a support aperture defined in said secondary support member and, upon rotating the bucket about a centerline extending through the front wheel, aligning and seating through a selected one of said apertures defined in said arcuate plate portion.

17. A tilting mechanism incorporated into a load carrying device including a bucket, a pair of elongate extending handles, and a front wheel, said tilting mechanism comprising:

a frame comprising supports which, in combination with the wheel, support the bucket upon a surface; and said frame further comprising a pivot point located at a height approximate said supports and a distance below the bucket and elongate extending handles, the bucket being tilted about a longitudinal axis extending between and below the elongated handles of the wheelbarrow and through its front wheel and said pivot point.

* * * * *